United States Patent

Judd et al.

[15] 3,675,159
[45] July 4, 1972

[54] SELF-OSCILLATING SWITCHING REGULATOR WITH FREQUENCY RESPONSIVE FEEDBACK LOOP GAIN CONTROL

[72] Inventors: Frank Fuller Judd, Madison; Jan Mark Lieberman, Lake Hiawatha; Helmut Wilhart, Whippany, all of N.J.

[73] Assignee: Bell Telephone Laboratories, Incorporated, Murray Hill, Berkeley Heights, N.J.

[22] Filed: Dec. 21, 1970

[21] Appl. No.: 100,149

[52] U.S. Cl............................331/109, 307/297, 321/19, 323/22 T, 331/111, 331/175, 331/183
[51] Int. Cl............................G05f 1/44, H03b 3/02
[58] Field of Search..................331/109, 111, 175, 183; 321/16, 18, 19; 323/18, 20, 22 SC, 22 T; 307/97, 129, 130, 132 R, 297; 328/267

[56] References Cited

UNITED STATES PATENTS

| | | | |
|---|---|---|---|
| 3,286,157 | 11/1966 | Leostic | 323/18 |
| 3,403,321 | 9/1968 | Mosak | 323/20 |
| 3,577,059 | 5/1971 | Kelley, Jr. | 321/18 X |

*Primary Examiner*—Roy Lake
*Assistant Examiner*—Siegfried H. Grimm
*Attorney*—R. J. Guenther and E. W. Adams, Jr.

[57] ABSTRACT

A self-oscillating switching mode regulator includes circuitry to automatically control the gain of voltage feedback loop. The gain circuitry is responsive to the deviations of the switching frequency of the regulator from some desired value. By altering the loop gain the frequency of the regulator can be regulated at the desired value.

5 Claims, 3 Drawing Figures

INVENTORS F. F. JUDD
J. M. LIEBERMAN
H. WILHART

BY Alfred J. Steinmetz
ATTORNEY

SELF-OSCILLATING SWITCHING REGULATOR WITH FREQUENCY RESPONSIVE FEEDBACK LOOP GAIN CONTROL

BACKGROUND OF THE INVENTION

This invention relates to switching mode voltage regulators. It is specifically concerned with the self-oscillating type switching regulator and relates more particularly to the regulation of the frequency of operation of the switching regulator.

Switching mode regulators operate by transmitting pulses of energy from a source of continuous energy to an output terminal via a switching device. The voltage level appearing at the output terminal is regulated by comparing it to a reference signal. An error signal is generated in response to this comparison and utilized to control the switching device transmitting the pulses of energy.

Switching mode regulators may be driven or self-oscillating. The driven regulator transmits the pulses of energy at a fixed frequency. This fixed frequency is controlled by a discrete frequency source. The driven switching regulator is stable with respect to frequency, but its response to changes in the output voltage level may be delayed since there may be a loss of regulation control during a portion of each switching cycle.

The self-oscillating switching mode regulator inherently counteracts excursions of the output voltage beyond specified levels. A typical self-oscillating switching mode voltage regulator shown in FIG. 1 has a series switching transistor 110 and a filter including the inductor 108 and the capacitor 109 inserted between an input terminal 101, to which power is applied, and an output terminal 103, to which a load is connected. The series switching transistor 110 is controlled so that it transmits energy whenever the voltage at terminal 103 drops below a specified level. The transmission of energy through transistor 110 is inhibited when the voltage at the output terminal 103 rises above another specified level. the voltage difference between these two specified levels is the system hysteresis of the switching mode regulator.

The control circuitry utilized to control the switching of the switching transistor 110 includes a potentiometer 117 coupled across the output terminals 103 and 104. A voltage proportional to the voltage across the output terminals 103 and 104 is transmitted from the wiper arm of the potentiometer 117 to a voltage error detector circuit 105. The voltage error detector circuit 105 comprises a source of reference voltage and a comparison circuit which generates a signal proportional to the difference between the reference voltage and the voltage at the wiper arm of the potentiometer 117. The signal output of the voltage error detector 105 is applied to an amplifier 106 and from thence to the base 111 of the switching transistor 110. This error signal determines the conductive state of the switching transistor 110. An observable property of the feedback loop is that the output voltage at which the transistor 110 is biased conductive is different from the output voltage at which it is biased nonconductive. This effect, known as parasitic hysteretic behavior, is due to the cumulative delay periods with which amplifier 106 and switching transistor 110 respond to the error signal. In consequence, the hysteretic bistable trigger which is ordinarily required in the feedback loop of a self-oscillating switching regulator can be omitted. The difference between the two output voltages at which the conductive state of transistor 110 changes is the system hysteresis of the regulator.

In operation the output voltage of the regulator increases until the error voltage output of detector 105 assumes a magnitude which biases the switching transistor 110 into its non-conducting state.

During the nonconducting period of transistor 110 the load current is supplied, via the flyback diode 107, the inductor 108 and discharging capacitor 109, to the output load. As the current in inductor 108 decays and capacitor 109 discharges, the output voltage across the output terminals 103 and 104 begins to decrease. As the output voltage decreases, the error signal output of the voltage error detector 105 changes in magnitude until eventually the switching transistor 110 is biased into conduction again.

While this regulator circuit arrangement is fairly simple and reliable, its frequency of operation may be unstable. For example, the switching frequency responds to changes in the input source voltage coupled to terminals 101 and 102 and to changes in the output load impedance coupled to output terminals 103 and 104. In addition, the frequency of operation is responsive to entrainment of the switching frequency to some outside frequency source coupled to the regulator or by periodic signals which may be reflected from the output load connected to the output terminals 103 and 104.

It is therefore an object of the present invention to operate a self-oscillating type switching mode regulator at a constant frequency.

It is another object of the invention to regulate the frequency of a self-oscillating switching regulator by controlling the gain of the voltage feedback loop.

SUMMARY OF THE INVENTION

The above objects are achieved by including elements with variable transmission gain in the voltage regulation feedback loop of a switching regulator. The gain of these elements is controlled in response to the deviations in the switching frequency of the regulator from some desired frequency. A variable impedance element is utilized to control the gain of the feedback loop. The impedance of this element is responsive to a frequency error signal proportional to the deviation of the switching frequency from the desired value. The controlled variation in gain controls the amplitude of the voltage feedback signal which in turn controls the switching frequency of the regulator. This variable impedance element comprises in part the conductive path of a semiconductor device.

BRIEF DESCRIPTION OF THE DRAWINGS

The invention may be readily understood upon reference to the following detailed specification and the attached drawings wherein.

DETAILED DESCRIPTION

Figure 1:
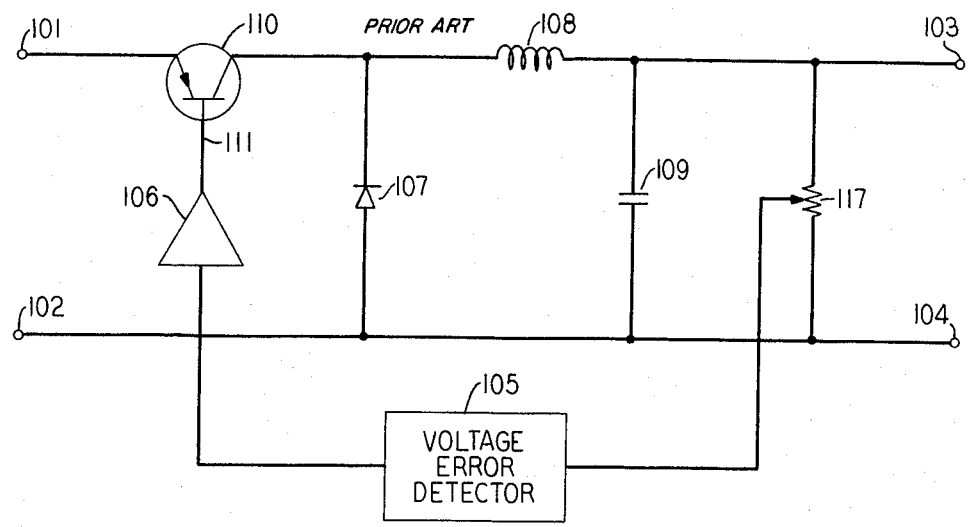
FIG. 1 is a diagram of a switching regulator according to the prior art and described hereinabove.
Figure 2:
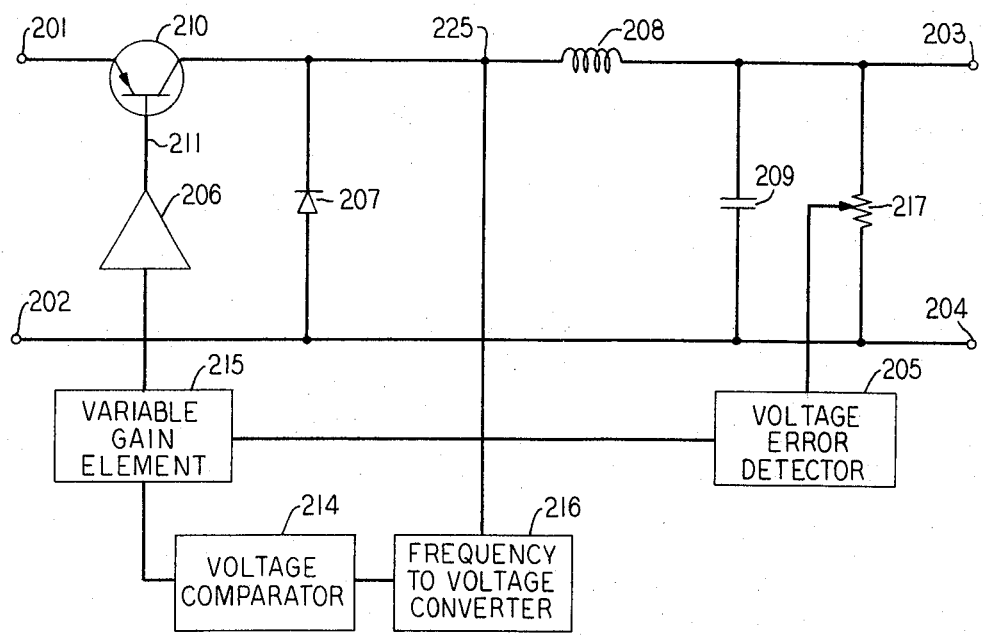
FIG. 2 is a diagram of a switching regulator including frequency regulation control in accord with the invention.

The switching mode regulator disclosed in FIG. 2 includes a frequency regulation loop in accord with the principles of the invention. The voltage regulation loop of the circuit operates in substantially the same fashion as described above with respect to the regulator disclosed in FIG. 1. An input voltage source is connected to the input terminals 201 and 202. The output load to be energized by a regulated voltage is connected to the output terminals 203 and 204. The voltage error detector 205 monitors the output voltage, via the potentiometer 217, shunted across the output terminals 203 and 204. The error detector 205 generates an error signal which is applied, via the variable gain element 215 and the amplifier 206, to the base 211 of the switching transistor 210. This error signal biases transistor 210 into a nonconducting condition when the output voltage exceeds a first threshold.

With transistor 210 in a nonconducting condition, current is supplied to the load via the flyback diode 207, the inductor 208 and the discharging capacitor 209. As the inductor current decays and capacitor 209 discharges, the output voltage decreases. When the output voltage decreases below another threshold value the error signal generated by the voltage error detector 205 biases the switching transistor 210 into its conducting state via amplifier 206. A conducting path is completed connecting the input source to the load, and the output voltage across terminals 203 and 204 increases until the feedback loop again acts to turn off transistor 210.

The operating frequency of the regulator is responsive to such variables as the input voltage, the output load impedance and the parameters of the voltage regulation feedback loop. A change in one variable which alters the switching frequency may be compensated for by a counteracting change in another variable in the feedback loop. For example, a change in frequency due to a load variation may be counteracted by a change in the gain of the feedback loop which returns the switching frequency to its regulated value.

In the circuit shown in FIG. 2 the feedback loop gain is controlled by controlling the amplitude of the feedback signal. This control of the feedback signal amplitude is an indirect method of controlling the system hysteresis of the regulator. While the hysteresis width of the feedback loop is constant, varying the amplitude of the voltage feedback signal can be considered as having the same effect as a change of the hysteresis width apparent to the feedback signal. Thus an increase in the amplitude of the voltage feedback signal can be thought of as effectively narrowing the hysteresis width of the voltage feedback loop relative to the amplitude of the voltage feedback signal. Similarly a decrease in the voltage feedback signal amplitude can be thought of as increasing the hysteresis width of the voltage feedback loop relative to the amplitude of the voltage feedback signal.

The operation frequency of the regulator is monitored by the frequency-to-voltage converter 216 which is coupled to the node 225 in the main conduction path of the regulator. The converter 216 generates a voltage proportional to the switching frequency of the regulator. This voltage is applied to the voltage comparator 214. The voltage comparator 214 compares this voltage with an internal reference voltage and generates an error signal proportional to the difference. This error signal is utilized to control the variable gain element 215 which is included in the voltage feedback loop. If the switching frequency of the regulator increases above its desired value, the error signal generated by the voltage comparator 214 reduces the gain of the variable gain element 215. If the switching frequency of the regulator is below its desired value the error signal generated by the voltage comparator 214 increases the gain of the variable gain element 215.

Figure 3:
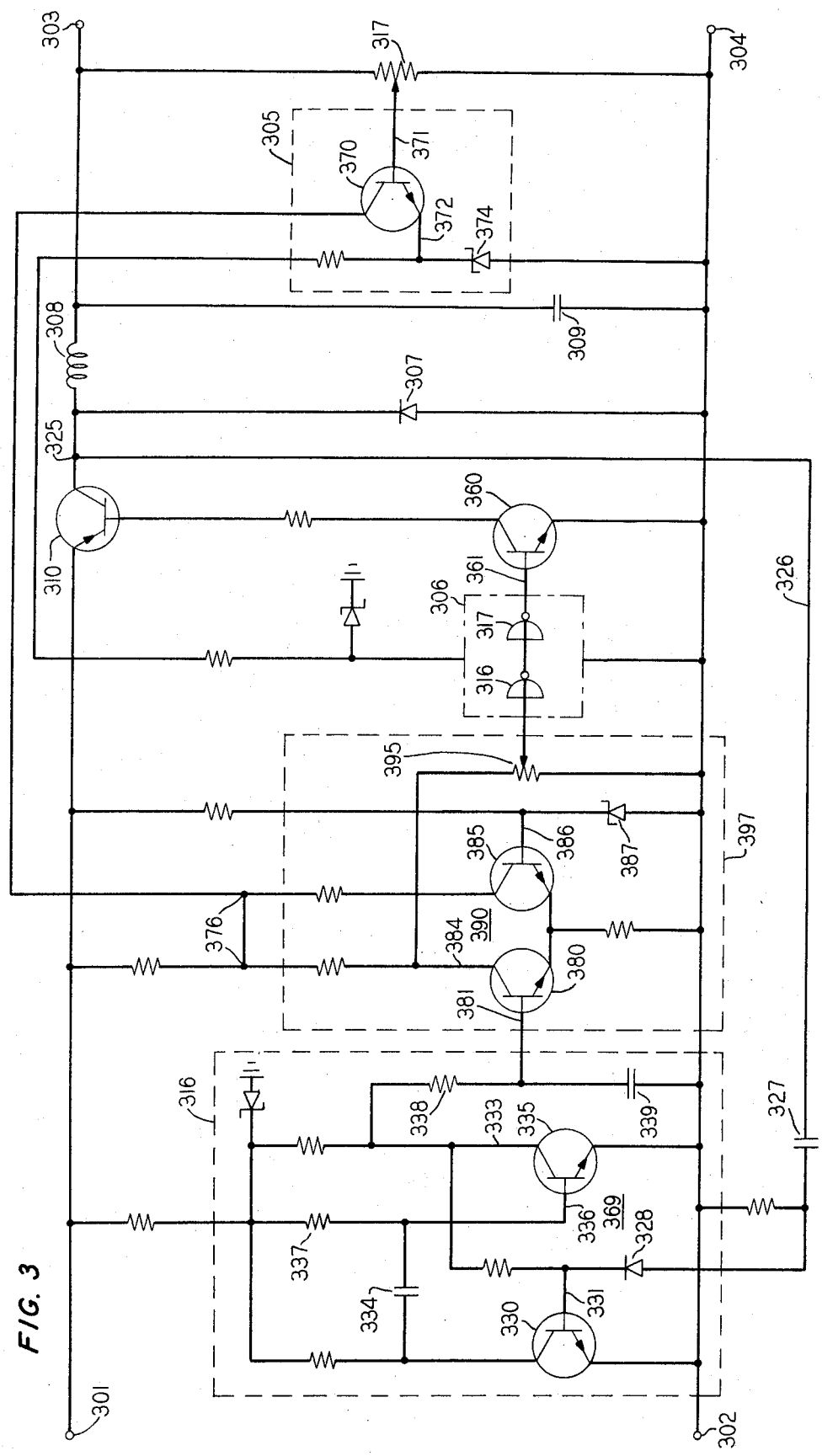
FIG. 3 is a schematic diagram of a switching regulator incorporating the frequency regulation principles of the invention.

The switching mode regulator disclosed in schematic form in FIG. 3 regulates the switching frequency by controlling the gain of the voltage feedback loop. The input voltage to be regulated is connected to the input terminals 301 and 302. The collector emitter path of the switching transistor 310 couples this input voltage via inductor 308 to an output load which is coupled to the output terminals 303 and 304. The output voltage is monitored by the voltage error detector 305 which is coupled to the potentiometer 317 shunted across the output terminals 303 and 304. The voltage error detector 305 includes the transistor 370 whose base electrode 371 is connected to the potentiometer 317. The emitter 372 is at a reference voltage established by the reference voltage breakdown diode 374. Hence the conductivity of transistor 370 is directly responsive to the deviations of the output voltage of the regulator from some desired value.

The collector voltage of transistor 370 is connected to node 376 which is coupled to a differential amplifier 390 consisting of emitter-coupled transistors 380 and 385. The differential amplifier 390 and potentiometer 395 form a variable gain element 397 which performs a voltage comparison function internally, as described below. The conductivity of the transistor 380 is responsive to the frequency regulation feedback loop which is described below. The feedback signal of the voltage regulation loop is coupled from collector terminal 384 of transistor 380 via potentiometer 395, to a clipping circuit 306 comprising NOR gates 316 and 317. The clipping circuit 306 is designed to shape the feedback signal applied to it from the wiper arm of potentiometer 395 into a stream of rectangular pulses suitable to operate transistor 360 and in turn transistor 310 in a switching mode. Potentiometer 395 is used to adjust the feedback signal amplitude with respect to the input thresholds of NOR gate 316. Since this adjustment allows a certain latitude while affecting the gain of the variable gain element 397, potentiometer 395 allows, within limits, a manual adjustment of the operating frequency of the switching regulator.

The overall response delay of clipping circuit 306, transistor 360, and transistor 310 gives rise to a parasitic hysteresis, as mentioned hereinabove. These elements therefore may be regarded as a distributed hysteretic bistable trigger. It should be noted that, although the squared output signal of clipping circuit 306 is of constant amplitude, clipping circuit 306 is nevertheless responsive to gain variations of the variable gain element 397. Such gain variations affect the slope of the applied signal and in turn the delay response of the above mentioned elements which possess parasitic hysteresis. Through this mechanism the relationship between loop gain and apparent hysteresis width is established, as described hereinabove.

In operation the switching transistor 310 is recurrently switched on and off to regulate the voltage across the output terminals 303 and 304 at some specified value. If the voltage goes above this value, the transistor 370 is biased into a high conductive condition which lowers its collector voltage and hence lowers the feedback voltage applied to node 376. This voltage applied, via differential amplifier 390 and potentiometer 395, to the clipping circuit 306, is below its operating threshold voltage. With no output from clipping circuit 306 applied to the base 361 of transistor 360, transistor 360 becomes nonconducting and turns off the switching transistor 310.

With transistor 310 nonconducting the output current is supplied, via the flyback diode 307, inductor 308 and discharging capacitor 309 to the load connected to the output terminals 303 and 304. As the inductor current decays and capacitor 309 discharges the output voltage decreases. The conductivity of transistor 370 decreases as the output voltage decreases. The resulting increased collector voltage is transmitted through the feedback loop to bias the switching transistor 310 into a conducting condition again.

In accord with the invention the gain of the voltage feedback loop is controlled in order to regulate the frequency of operation of the regulator. As described above, the frequency is regulated in response to a frequency-to-voltage converter 316 which controls a variable gain element 397 comprising the differential amplifier 390 and the potentiometer 395 in the voltage feedback loop. The differential amplifier 390 also performs a comparator function, as described below. The frequency-to-voltage converter 316 comprises a monostable multivibrator 369 and an integrating network consisting of resistor 338 and capacitor 339 to integrate the pulse output of the monostable multivibrator 369. The input of the monostable multivibrator 369 is coupled to node 325 via lead 326 and the differentiating capacitor 327 which shapes the pulse wavefront signal resulting from the turn on of the switching transistor 310 into a trigger signal. This signal is applied, via diode 328, to the base 331 of transistor 330, triggering the transistor 330 into a saturated conducting condition. With transistor 330 saturated a negative pulse with respect to ground potential is applied, via the cross-coupling capacitor 334, to the base 336 of transistor 335. This pulse signal turns the normally saturated transistor 335 off.

As a result of transistor 335 turning off a positive pulse is generated at the collector 333 of transistor 335. The width of this pulse is determined by the capacitor 334 and resistor 337. It is apparent that the average DC voltage across the integrating capacitor 339 is dependent on the pulse repetition rate and pulse width of the monostable multivibrator 369. The pulse repetition rate is equal to the switching frequency of transistor 310 so that the average DC voltage across capacitor 339, which is the output voltage of frequency-to-voltage converter 316, is proportional to the switching frequency of the regulator.

The variable gain element 397 in the feedback loop comprises a differential amplifier 390 consisting of transistors 380 and 385, and a potentiometer 395. The conductivity of the transistor 380 is responsive to the output voltage of the frequency-to-voltage converter 316 as well as the conductivity of transistor 385 which is emitter coupled to transistor 380. Since the base terminal 386 of transistor 385 is held at a constant reference voltage by means of reference diode 387, a comparison function is performed upon the output voltage of the frequency-to-voltage converter 316. It is apparent that the magnitude of the voltage feedback signal appearing at the potentiometer 395 is a function of the magnitude of the conductivity of the transistor 380. If, for example, the switching frequency of transistor 310 increases above the regulated value, the increased output voltage of the frequency-to-voltage converter 316 will increase the conductivity of transistor 380 to a degree controlled by the emitter coupled transistor 385 which performs the referencing function. This will reduce the amplitude of the voltage feedback signal as applied to clipping circuit 306 and hence increase the effective hysteresis of the voltage feedback loop. As a consequence, the switching frequency will be reduced to its regulated value. If the switching frequency decreases the converse operation will occur to increase it to its regulated value.

What is claimed is:

1. A self-oscillating switching regulator to derive a regulated voltage from an unregulated source comprising
   an input and an output,
   a switching device coupling said input and output,
   a voltage regulation feedback loop to control said switching device, said voltage regulation feedback loop including a controllable signal gain means and means to clip feedback signals in said voltage regulation loop,
   a frequency-to-voltage converter responsive to the switching frequency of said switching device, and
   means to utilize the output of said converter to control said controllable signal gain means.

2. A self-oscillating switching regulator as defined in claim 1 wherein said controllable signal gain means comprises
   a source of reference voltage and a pair of differentially coupled amplifier devices, one of said amplifier devices responsive to said converter, the other amplifier device responsive to the reference voltage, and
   said means to clip comprises two overdriven cascaded logic gates coupling the output of said first amplifier device to said switching device.

3. A self-oscillating switching regulator as defined in claim 2 wherein said logic gates comprise NOR gates and said pair of amplifier devices comprise two emitter-coupled transistors.

4. A self-oscillating switching regulator to supply a regulated output voltage from an unregulated voltage source comprising
   input and output terminals,
   a switching device interconnecting said input and output terminals and including a control electrode to control switching therein,
   a voltage regulating feedback loop responsive to the voltage at said output terminal and coupled to said control electrode,
   said voltage regulating feedback loop sustaining self-oscillatory switching of said switching device,
   a frequency-to-voltage converter responsive to the frequency of said switching device,
   a reference voltage source,
   means to generate a voltage responsive to the difference between the voltage output of said converter and said reference voltage, and
   said means to generate a voltage including a variable gain device included in said voltage regulating feedback loop and responsive to the voltage output of said frequency-to-voltage converter, whereby the controlled variation in said variable gain device adjusts the feedback loop gain to regulate the switching frequency of said switching device.

5. A self-oscillating switching regulator as defined in claim 4 wherein said means to generate a voltage includes
   a first transistor to function as said variable gain device, and biased by the voltage output of said frequency to voltage converter,
   a second transistor biased by said reference voltage,
   said first and second transistors being emitter coupled in a differential amplifier configuration, and
   said voltage regulating feedback loop including two cascaded NOR logic gates coupled to the output of said differential amplifier.

* * * * *